United States Patent
Kim et al.

(10) Patent No.: US 9,567,241 B2
(45) Date of Patent: Feb. 14, 2017

(54) CONTINUOUS CIRCULATION SAND FILTER AND CONTINUOUS CIRCULATION SAND FILTERING METHOD

(75) Inventors: Youn-Kook Kim, Seoul (KR); You-Mee Na, Seoul (KR); Ho-Chan Jung, Seoul (KR); Ha-Na Yu, Seoul (KR)

(73) Assignee: COWAY ENTECH CO., LTD (KR)

(*) Notice: Subject to any disclaimer, the term of this patent is extended or adjusted under 35 U.S.C. 154(b) by 433 days.

(21) Appl. No.: 14/240,130

(22) PCT Filed: Sep. 6, 2012

(86) PCT No.: PCT/KR2012/007199
§ 371 (c)(1),
(2), (4) Date: Feb. 21, 2014

(87) PCT Pub. No.: WO2013/036055
PCT Pub. Date: Mar. 14, 2013

(65) Prior Publication Data
US 2014/0190908 A1    Jul. 10, 2014

(30) Foreign Application Priority Data
Sep. 7, 2011  (KR) ................. 10-2011-0090891

(51) Int. Cl.
*B01D 24/22* (2006.01)
*C02F 1/00* (2006.01)
*B01D 24/46* (2006.01)

(52) U.S. Cl.
CPC ............. *C02F 1/004* (2013.01); *B01D 24/22* (2013.01); *B01D 24/4689* (2013.01)

(58) Field of Classification Search
CPC ....... B01D 24/22; B01D 24/4689; C02F 1/004
See application file for complete search history.

(56) References Cited

U.S. PATENT DOCUMENTS 5,173,194 A * 12/1992 Hering, Jr. ............. B01D 24/30
                                                    210/189
5,681,472 A * 10/1997 Jonsson ................. B01D 24/30
                                                    210/189
(Continued)

FOREIGN PATENT DOCUMENTS

| JP | 2003200185 | 7/2003 |
| JP | 2004255261 | 9/2004 |
| KR | 100501522 | 7/2005 |

OTHER PUBLICATIONS

Written Opinion—PCT/KR2012/007199 dated Jan. 30, 2013.
International Search Report—PCT/KR2012/007199 dated Jan. 30, 2013.

*Primary Examiner* — Christopher P Jones
(74) *Attorney, Agent, or Firm* — Cantor Colburn LLP

(57) ABSTRACT

Provided is a continuous circulation sand filter including a filtering barrel filled with a sand filtering layer, an inflow tube for introducing raw water into the filtering barrel, a treated water discharge part for discharging treated water purified by passing the raw water through the sand filtering layer from a lower end of the sand filtering layer to an upper end thereof, an air lift tube for transferring contaminated sand, located in the lower end of the sand filtering layer, from a lower part of the filtering barrel to an upper part thereof, a transfer water discharge filter contacting the air lift tube to discharge transfer water moved upward together with sand through the air lift tube and trap the sand and a foreign substance, a descent guide tube downwardly moving the sand and the foreign substance moved to the upper part of the filtering barrel through the air lift tube, and a foreign substance separation tube suctioning the downwardly moving foreign substance to remove the foreign substance from the downwardly moving sand, and discharging the foreign substance.

10 Claims, 3 Drawing Sheets

(56) References Cited

U.S. PATENT DOCUMENTS

| | | | |
|---|---|---|---|
| 6,143,186 A | 11/2000 | Van Unen | |
| 7,713,426 B2* | 5/2010 | Newcombe | C02F 3/223 |
| | | | 210/650 |
| 2004/0144728 A1* | 7/2004 | Moller | B01D 21/01 |
| | | | 210/688 |
| 2005/0077247 A1 | 4/2005 | Stedman | |
| 2006/0000785 A1* | 1/2006 | Moller | B01D 21/01 |
| | | | 210/760 |
| 2011/0168641 A1 | 7/2011 | Boyd et al. | |
| 2014/0014590 A1* | 1/2014 | Dalbo | C02F 1/004 |
| | | | 210/714 |

\* cited by examiner

CONTINUOUS CIRCULATION SAND FILTER AND CONTINUOUS CIRCULATION SAND FILTERING METHOD

TECHNICAL FIELD

The present invention relates to a continuous circulation sand filter, and more particularly, to a continuous circulation sand filter that suctions sand washing water to separate the sand washing water.

BACKGROUND ART

Recently developed continuous circulation sand filters not only filter introduced water by using sand, and but also wash the sand. Such a continuous circulation sand filter is illustrated in FIGS. 1 and 2.

Referring to FIGS. 1 and 2, the continuous circulation sand filter includes a raw water inflow tube 1, a raw water distribution tube 7, a sand filtering layer 8, and a treated water outflow tube 2. Raw water introduced through the raw water inflow tube 1 is uniformly dispersed in the sand filtering layer 8 through the raw water distribution tube 7, and While the introduced raw water passes through the sand filtering layer 8, a foreign substance is removed from the introduced raw water to produce treated water that is discharged through the treated water outflow tube 2.

Contaminated sand located in the lower part of the continuous circulation sand filter is moved upward through an air lift tube 4 by compressed air generated in a compressed air supply part 5 and moved through an air inflow tube 6. A sand washing device 10 is disposed on the upper part of the air lift tube 4 as illustrated in FIG. 2.

Sand, arriving at the sand washing device 10, is moved downward through a bellows tube 11 from a washing barrel 15, and is stacked on the upper part of the sand filtering layer 8. A foreign substance removed from the sand is discharged through a washing water outflow tube 3.

Since the bellows tube 11 is disposed under the washing barrel 15 of the sand washing device 10, when sand moving in a zigzag shape temporarily stays within the bellows tube 11, treated water is moved from the lower end of the bellows tube 11 to the upper end thereof, so as to remove a foreign substance from the sand.

As such, since transfer water, moving upward together with sand through an air lift tube of a continuous circulation sand filter, is discharged together with sand washing water through a washing water outflow tube, the generation of sand washing water is increased. In addition, although the continuous circulation sand filter includes a bellows tube to sufficiently remove a foreign substance, while a foreign substance is removed, the foreign substance may flow down together with sand from a washing barrel and be undesirably discharged together with filtered water through a treated water outflow tube. In addition, while sand is stagnant in a sand washing device, the washing barrel of the sand washing device and the bellows tube may be clogged with sand.

Japanese Patent Publication Nos. 2003-200185 and 2004-255261 disclose an apparatus that moves a filtering material upward through an air lift tube to thereby remove a foreign substance from the filtering material. The apparatus includes a separation device at the upper end of the air lift tube to separate water, a solid formed through a biological treatment, and the filtering material moving upward through the air lift tube. The separation device includes a screen that traps the filtering material erupting from the air lift tube and that returns the trapped filtering material into the apparatus. The water and the solid, passing through the screen, are discharged through a washing drain tube. However, since such a separation device separates a filtering material first, and discharges water and solid together, an amount of contaminated discharged water is increased.

DISCLOSURE OF INVENTION

Technical Problem

Embodiments provide a continuous circulation sand filter that prevents a foreign substance from being mixed with treated water, thereby preventing the foreign substance from contaminating the treated water.

Embodiments also provide a continuous circulation sand filter that separates transfer water first to minimize generation of sand washing water and that ensures circulation of sand during washing of the sand.

Embodiments also provide a continuous circulation sand filtering method that separates transfer water first to prevent the transfer water from disturbing separation of sand and a foreign substance.

Solution to Problem

In one embodiment, a continuous circulation sand filter includes: a filtering barrel filled with a sand filtering layer; an inflow tube for introducing raw water into the filtering barrel; a treated water discharge part for discharging treated water purified by passing the raw water through the sand filtering layer from a lower end of the sand filtering layer to an upper end thereof; an air lift tube for transferring contaminated sand, located in the lower end of the sand filtering layer, from a lower part of the filtering barrel to an upper part thereof; a transfer water discharge filter contacting the air lift tube to discharge transfer water moved upward together with sand through the air lift tube and trap the sand and a foreign substance; a descent guide tube downwardly moving the sand and the foreign substance moved to the upper part of the filtering barrel through the air lift tube; and a foreign substance separation tube suctioning the downwardly moving foreign substance to remove the foreign substance from the downwardly moving sand, and discharging the foreign substance.

The transfer water discharge filter may include a mesh formed of a metal.

A suction pump may be disposed on the foreign substance separation tube to forcibly discharge a foreign substance.

The transfer water discharge filter may be disposed on an upper end of the air lift tube such that transfer water passes through the transfer water discharge filter.

The continuous circulation sand filter may further include an air inflow tube compressing air to supply the compressed air to a lower end of the air lift tube, wherein upward moving force of the compressed air upwardly moves the contaminated sand within the air lift tube.

In another embodiment, a continuous circulation sand filtering method includes: supplying raw water to a sand filtering layer and moving the raw water to an upper part of the sand filtering layer to filter the raw water, thereby producing treated water; upwardly moving contaminated sand and transfer water by using upwardly moving air, so as to separate the contaminated sand and the transfer water into a foreign substance, sand, and the transfer water; separating the foreign substance, the sand, and the transfer water into the transfer water, as a liquid, and the sand and the foreign substance as solids; discharging the transfer water together with the treated water; and separating the sand and the foreign substance from each other.

A filter may be used to separate the foreign substance, the sand, and the transfer water into the liquid and the solids.

In the separating of the sand and the foreign substance, the sand and the foreign substance may be moved downward.

The foreign substance separated by downwardly moving the sand and the foreign substance may be discharged through suction.

A descent guide tube and a foreign substance separation tube obliquely diverging upward from a side surface of a lower end of the descent guide tube may be used to separate the sand and the foreign substance.

Advantageous Effects of Invention

According to the embodiments of the present invention, since transfer water is separated first and is discharged together with treated water, the transfer water is prevented from disturbing separation of sand and a foreign substance. In addition, the foreign substance is prevented from being mixed with the treated water, thereby preventing the foreign substance from contaminating the treated water. In addition, generation of sand washing water is minimized, and circulation of sand during washing of the sand is not disturbed.

MODE FOR THE INVENTION

Figure 1:
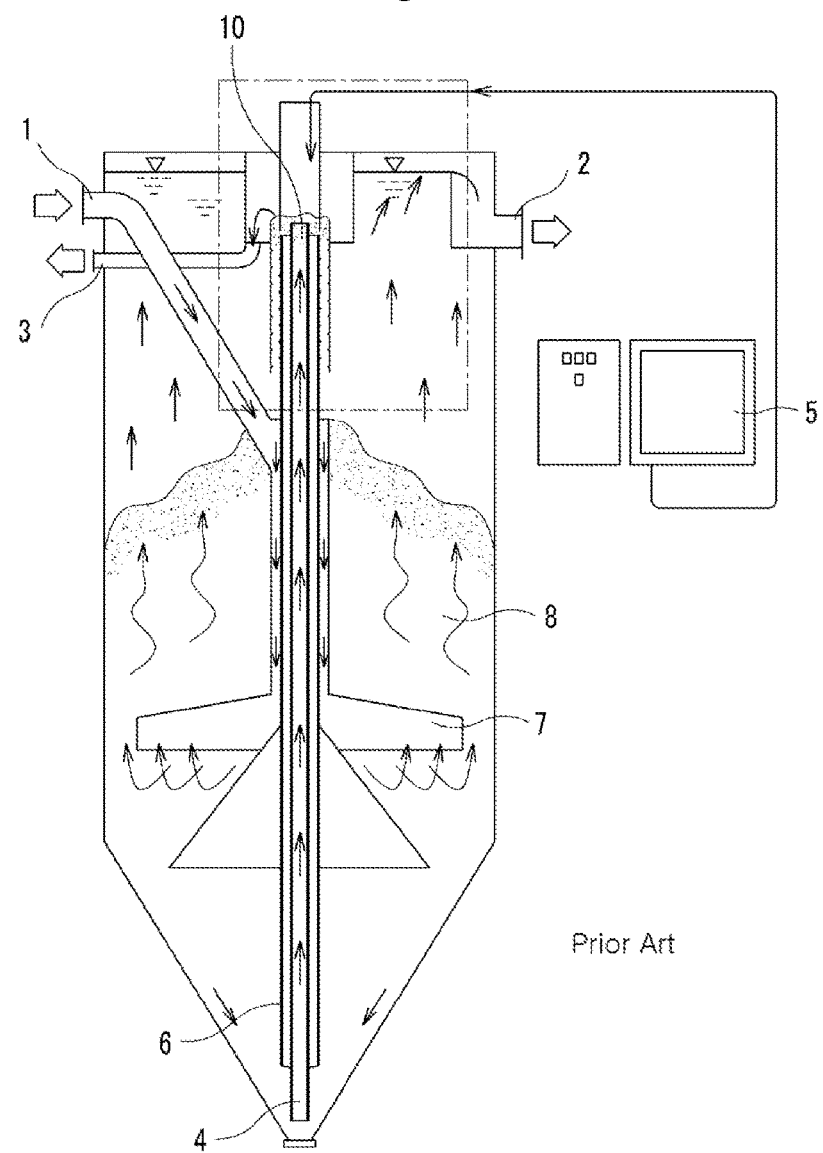
FIG. 1 is a cross-sectional view illustrating a continuous circulation sand filter in the related art.
Figure 2:
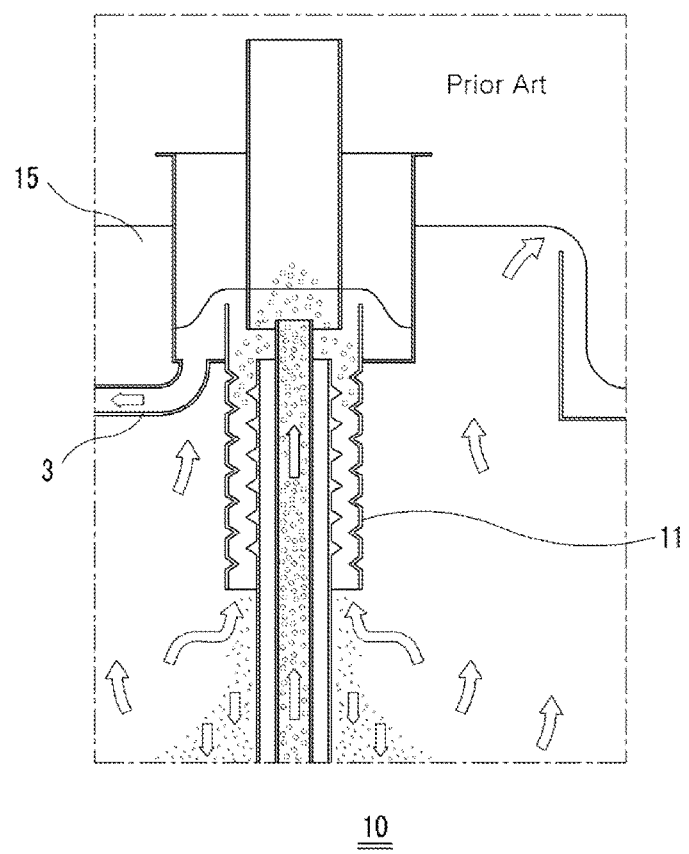
FIG. 2 is a cross-sectional view illustrating a sand washing device of a continuous circulation sand filter in the related art.
Figure 3:
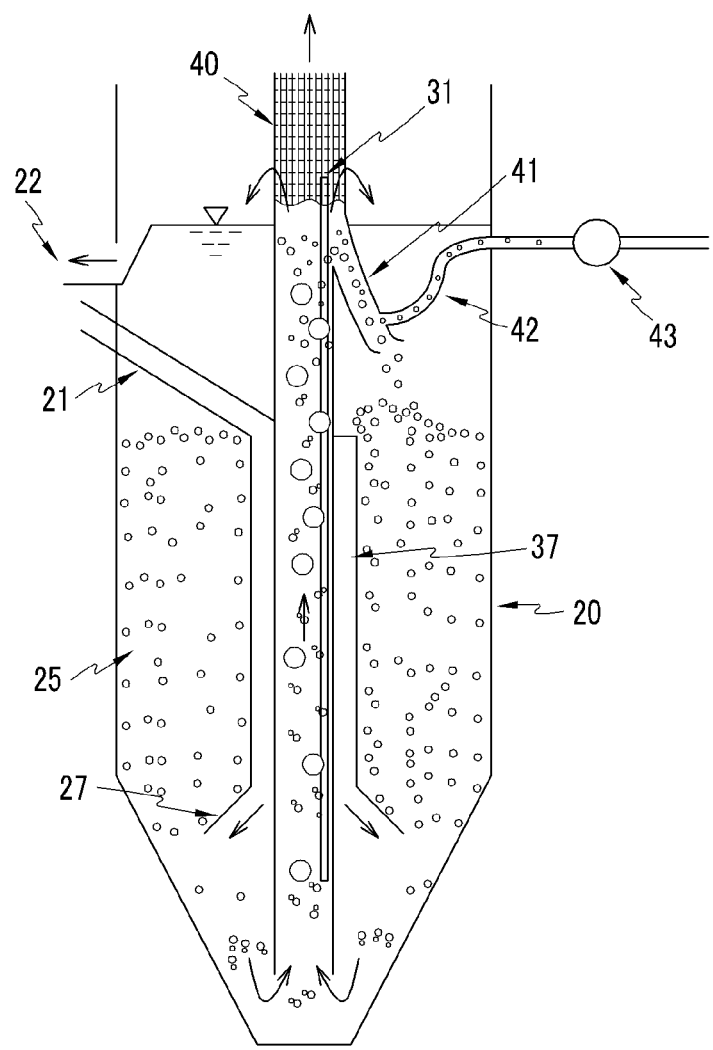
FIG. 3 is a cross-sectional view illustrating a continuous circulation sand filter according to an embodiment of the present invention.

Hereinafter, a continuous circulation sand filter according to a preferred embodiment of the present invention will be described with reference to the drawing. FIG. 3 is a cross-sectional view illustrating a continuous circulation sand filter according to an embodiment of the present invention.

Referring to FIG. 3, a continuous circulation sand filter according to the current embodiment includes a filtering barrel 20 having an upper cylindrical shape and a lower conic shape that decreases in width downward.

The filtering barrel 20 has a hollow therein in which sand is washed and raw water is filtered. An inflow tube 21 is disposed on a side portion of the filtering barrel 20 to introduce raw water into the hollow. The inflow tube 21 extends downward. A raw water distribution tube 27, which increases in diameter downward, is disposed at the lower end of the inflow tube 21. Thus, raw water introduced through the inflow tube 21 and flowing downward along the inflow tube 21 within the filtering barrel 20 is widely spread at the raw water distribution tube 27 disposed at the lower end of the inflow tube 21.

A sand filtering layer 25 formed of sand is disposed between the inflow tube 21, the raw water distribution tube 27, and an inner wall of the filtering barrel 20. Since the raw water distribution tube 27 is embedded in the sand filtering layer 25, raw water discharged through the raw water distribution tube 27 is moved to the upper part of the filtering barrel 20 through pores formed in the sand filtering layer 25. At this point, the raw water is filtered.

Raw water passing through the sand filtering layer 25 is purified as treated water. When the level of treated water reaches a certain value or higher, the treated water is automatically discharged. To this end, a treated water discharge part 22 is disposed in the upper part of the filtering barrel 20. When raw water is continually introduced into the filtering barrel 20, the level of treated water within the filtering barrel 20 is continually increased, so that the treated water can be automatically discharged through the treated water discharge part 22.

An air inflow tube 31 is disposed in the central part of the filtering barrel 20. The air inflow tube 31 passes through the upper part of the filtering barrel 20, and extends down to the lower part thereof. The air inflow tube 31 receives compressed air and uses kinematic energy of the compressed air to move contaminated sand from the sand filtering layer 25 disposed in the lower part of the filtering barrel 20 to the upper part of the filtering barrel 20 through an air lift tube 37.

The air inflow tube 31 is disposed within the inflow tube 21 and the raw water distribution tube 27. Also, the air lift tube 37 is disposed within the inflow tube 21 and the raw water distribution tube 27. The air inflow tube 31 is disposed within the air lift tube 37. Since the lower end of the air lift tube 37 is lower than the lower end of the air inflow tube 31, compressed air introduced into the air inflow tube 31 flows to the lower end of the air lift tube 37 through the lower end of the air inflow tube 31.

The air lift tube 37 extends from the lowest end of the filtering barrel 20 to the upper side of the sand filtering layer 25. Contaminated sand, introduced from the lowest end of the sand filtering layer 25 into the lower end of the air lift tube 37, and compressed air, introduced through the air inflow tube 31, are moved upward through the air lift tube 37.

A transfer water discharge filter 40 and a descent guide tube 41 are disposed on the upper part of the air lift tube 37.

The transfer water discharge filter 40 is connected to the upper end of the air lift tube 37. The descent guide tube 41 obliquely diverges downward from the upper part of the air lift tube 37. The descent guide tube 41 has an open end. A foreign substance separation tube 42 obliquely diverges upward from a side surface of the lower end of the descent guide tube 41. The foreign substance separation tube 42 extends out of the filtering barrel 20. A suction pump 43 is disposed out of the filtering barrel 20.

Pores formed in the transfer water discharge filter 40 are smaller than sand and a foreign substance. Thus, while water and air pass through the transfer water discharge filter 40, sand and a foreign substance cannot pass therethrough. The transfer water discharge filter 40 includes a mesh formed of a metal.

Materials moving upward along the air lift tube 37 include contaminated sand, water (transfer water), and air. At this point, the contaminated sand is separated into a foreign substance and sand. Thus, the materials arriving at the upper part of the air lift tube 37 may be separated into sand, water, air, and a foreign substance. Of these, the air is discharged through an open upper portion of the transfer water discharge filter 40, and the water is passed through the transfer water discharge filter 40 and is discharged together with treated water to the treated water discharge part 22.

The foreign substance and the sand move along the descent guide tube 41. Since the foreign substance is light weight, when the suction pump 43 is operated, the foreign substance is discharged to the outside through the foreign substance separation tube 42. Since the sand is heavy weight, the sand falls through an open lower end of the descent guide tube 41.

The sand falling through the open lower end of the descent guide tube 41 is purified sand that is stacked on the top of the sand filtering layer 25. Accordingly, a sand layer is continually circulated from the lower part of the filtering barrel 20 to the upper part thereof and is washed, and raw water introduced through the inflow tube 21 is purified by the sand filtering layer 25 and is discharged to the treated water discharge part 22. In addition, sand washing water containing the foreign substance is discharged to the outside through the foreign substance separation tube 42. Thus, while the raw water is purified, the sand is washed, and only the sand washing water containing the foreign substance is discharged to the outside.

The continuous circulation sand filter according to the current embodiment includes the transfer water discharge filter 40, the descent guide tube 41, and the foreign substance separation tube 42 on the upper part of the air lift tube 37, and transfer water is discharged to the outside through the transfer water discharge filter 40. Thus, generation of sand washing water can be minimized. In addition, since a foreign substance is forcibly discharged by the suction pump 43, the foreign substance can be prevented from contaminating treated water, and sand can be washed more quickly.

Hereinafter, a continuous circulation sand filtering method according to an embodiment of the present invention will now be described A continuous circulation sand filtering method according to an embodiment of the present invention includes: supplying raw water to a sand filtering layer and moving the raw water to an upper part of the sand filtering layer to filter the raw water, thereby producing treated water; upwardly moving contaminated sand and transfer water by using upwardly moving air, so as to separate the contaminated sand and the transfer water into a foreign substance, sand, and the transfer water; separating the foreign substance, the sand, and the transfer water into the transfer water, as a liquid, and the sand and the foreign substance as solids; discharging the transfer water together with the treated water; and separating the sand and the foreign substance from each other.

Each operation of the continuous circulation sand filtering method will now be described in detail.

First, raw water is supplied to a sand filtering layer and is moved to an upper part of the sand filtering layer to filter the raw water, thereby producing treated water. While the raw water moves to the upper part of the sand filtering layer, a contaminant is removed from the raw water to produce the treated water, and is trapped in sand of the sand filtering layer.

Next, contaminated sand and transfer water are moved upward by using upwardly moving air, so as to separate the contaminated sand and the transfer water into a foreign substance, sand, and the transfer water. While the contaminated sand trapping the contaminant is moved upward and disturbed by the upwardly moving air, thereby separating the foreign substance from the contaminated sand. For example, the contaminated sand and the transfer water may be moved upward through an air lift tube perpendicular to the sand filtering layer, and the upwardly moving air may be supplied through an air inflow tube disposed within the air lift tube.

Subsequently, the foreign substance, the sand, and the transfer water are separated into the transfer water, as a liquid, and the sand and the foreign substance as solids. Thus, the transfer water can be discharged first, thereby minimizing the generation of sand washing water. For example, a filter may be used to separate the transfer water from the sand and the foreign substance. To this end, pores formed in the filter may be smaller than the sand and the foreign substance, so that the sand and the foreign substance can be prevented from passing through the filter.

Subsequently, the transfer water is discharged together with the treated water. The transfer water, separated from the sand and the foreign substance as solids, is discharged together with the treated water produced by filtering the raw water.

Next, the sand and the foreign substance as solids are separated from each other.

The sand and the foreign substance as solids separated from the transfer water are separated from each other. At this point, the solids are guided to move downward, and are separated into the sand and the foreign substance according to a weight difference therebetween. To this end, a descent guide tube and a foreign substance separation tube obliquely diverging upward from a side surface of the lower end of the descent guide tube are used. Thus, the sand, which is heavier than the foreign substance, falls through an open lower end of the descent guide tube and is introduced into the sand filtering layer, and the foreign material is discharged through the foreign substance separation tube by suction force of a suction pump.

According to the above described embodiments, a foreign substance, sand, and transfer water, which are moved upward and separated through an air lift tube, are separated again into the transfer water, as a liquid, and the sand and the foreign substance as solids, and the transfer water is discharged first, thereby minimizing the generation of sand washing water.

As such, since transfer water is separated first and is discharged together with treated water, the transfer water is prevented from disturbing separation of sand and a foreign substance, thereby effectively separating the sand and the foreign substance.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A continuous circulation sand filter comprising:
a filtering barrel filled with a sand filtering layer;
an inflow tube for introducing raw water into the filtering barrel;
a treated water discharge part for discharging treated water purified by passing the raw water through the sand filtering layer from a lower end of the sand filtering layer to an upper end thereof;
an air lift tube for transferring contaminated sand, located in the lower end of the sand filtering layer, from a lower part of the filtering barrel to an upper part thereof;
a transfer water discharge filter contacting the air lift tube to discharge transfer water moved upward together with sand through the air lift tube and trap the sand and a foreign substance;
a descent guide tube downwardly moving the sand and the foreign substance moved to the upper part of the filtering barrel through the air lift tube; and
a foreign substance separation tube suctioning the downwardly moving foreign substance to remove the foreign substance from the downwardly moving sand, and discharging the foreign substance.

2. The continuous circulation sand filter according to claim 1, wherein the transfer water discharge filter comprises a mesh formed of a metal.

3. The continuous circulation sand filter according to claim 1, wherein a suction pump is disposed on the foreign substance separation tube to forcibly discharge a foreign substance.

4. The continuous circulation sand filter according to claim 1, wherein the transfer water discharge filter is disposed on an upper end of the air lift tube such that transfer water passes through the transfer water discharge filter.

5. The continuous circulation sand filter according to claim 1, further comprising an air inflow tube compressing air to supply the compressed air to a lower end of the air lift tube,
wherein upward moving force of the compressed air upwardly moves the contaminated sand within the air lift tube.

6. A continuous circulation sand filtering method comprising:
supplying raw water to a sand filtering layer and moving the raw water to an upper part of the sand filtering layer to filter the raw water, thereby producing treated water;
upwardly moving contaminated sand and transfer water by using upwardly moving air, so as to separate the contaminated sand and the transfer water into a foreign substance, sand, and the transfer water;
separating the foreign substance, the sand, and the transfer water into the transfer water, as a liquid, and the sand and the foreign substance as solids;
discharging the transfer water together with the treated water; and
separating the sand and the foreign substance from each other.

7. The continuous circulation sand filtering method according to claim 6, wherein a filter is used to separate the foreign substance, the sand, and the transfer water into the liquid and the solids.

8. The continuous circulation sand filtering method according to claim 6, wherein in the separating of the sand and the foreign substance, the sand and the foreign substance are moved downward.

9. The continuous circulation sand filtering method according to claim 8, wherein the foreign substance separated by downwardly moving the sand and the foreign substance is discharged through suction.

10. The continuous circulation sand filtering method according to claim 8, wherein a descent guide tube and a foreign substance separation tube obliquely diverging upward from a side surface of a lower end of the descent guide tube are used to separate the sand and the foreign substance.

* * * * *